United States Patent [19]

Wolvin et al.

[11] 3,972,763

[45] Aug. 3, 1976

[54] METHOD OF LAMINATING PLANAR AND CORRUGATED SURFACE DEFINING LAYERS OF SHEET MATERIAL

[75] Inventors: Arthur Dale Wolvin, Longview; Richard Milton Morris, Jr., Bellevue, both of Wash.

[73] Assignee: Weyerhaeuser Company, Tacoma, Wash.

[22] Filed: June 10, 1974

[21] Appl. No.: 477,845

[52] U.S. Cl. ................................ 156/210; 156/291; 156/295; 428/182; 428/186; 428/195; 428/211

[51] Int. Cl.$^{2}$ ......................... B31F 1/20; B32B 3/28

[58] Field of Search ........... 161/133, 137, 146, 148; 156/210, 205, 291, 295; 428/182, 184, 186, 198, 195, 211

[56] References Cited

UNITED STATES PATENTS

| | | | |
|---|---|---|---|
| 2,178,566 | 11/1939 | Dike et al. | 156/295 |
| 2,209,311 | 7/1940 | Karcher | 161/137 |
| 2,290,548 | 7/1942 | Galber | 156/295 |
| 2,406,815 | 9/1946 | Elfving | 161/148 |
| 2,531,128 | 11/1950 | Hobbs | 161/148 |
| 3,033,708 | 5/1962 | McKee | 161/137 |

FOREIGN PATENTS OR APPLICATIONS

| | | |
|---|---|---|
| 1,935,549 | 3/1971 | Germany |
| 1,348,232 | 3/1974 | United Kingdom |

*Primary Examiner*—Marion E. McCamish
*Assistant Examiner*—P. J. Thibodeau
*Attorney, Agent, or Firm*—christensen, O'Connor, Garrison & Havelka

[57] ABSTRACT

The product is a laminar composite of two or more adhesively bonded layers of sheet material, one of which has a corrugated surface contour at the interface between the layers. The layers are bonded together at the ridges of the corrugated surface of the one layer, and the bond on each ridge consists essentially of a series of relatively localized spots of a plastically deposited but adhesively set adhesive material. The spots are located at intervals spaced apart from one another lengthwise of the ridge, and are characterized with oblate cross sections in planes normal to the interface between the layers, resulting from the fact that the spots undergo compression in the plastic state thereof during the process. The bonding operation is accomplished by causing relative motion between the corrugated web and a series of spaced parallel lines of adhesive material which are disposed crosswise of the ridges of the web and contacted with the ridges so as to deposit the spots thereon.

14 Claims, 22 Drawing Figures

METHOD OF LAMINATING PLANAR AND CORRUGATED SURFACE DEFINING LAYERS OF SHEET MATERIAL

THE INVENTION IN GENERAL

This invention concerns an apparatus and technique for manufacturing a laminar composite of two or more adhesively bonded layers of sheet material, one of which has a corrugated surface contour at the interface between the layers. The invention also concerns a product of this nature, and particularly a product comprising two or more adhesively bonded layers of a wood fiber or pulp sheet material, such as two or more layers of the paper-like material from which corrugated containers are made. The term "corrugated" is synonymous with a surface contour in which there are alternate, straight, parallel ridges and grooves that extend in serial array across one dimension or direction of the surface. Ordinarily, the ridges and grooves are also substantially sinusoidally contoured in this direction, but in the broader context of the invention, they may be formed otherwise, as shall be apparent fron the description of the invention which follows hereinafter.

As indicated, the invention is especially applicable to the manufacture of corrugated paper products. In the paper industry, these paper products are commonly known as "corrugated board", and they each comprise a core layer having a corrugated body configuration, and at least one other, but more often two other layers which are sandwiched with the core layer and have substantially planar body configurations. The three-layer product is known as "double-faced board" and is commonly manufactured in a machine which receives pliable webs of the board material and passes then about and between a series of power driven rolls which operate, first, to impart a corrugated body configuration to the corrugated layer web, and then in one or more subsequent stages, to bond each of the respective planar layer webs to the corrugated layer web. Each bonding operation is accomplished by applying adhesive to the ridges of the corrugated layer web, and then contacting the respective planar layer web with the ridges and pressing the two webs together until a bond is achieved between the webs. Moreover, in the typical machine, the corrugating operation and the initial bonding operation are closely integrated in that the machine includes a pair of cooperating corrugating rolls, and after the corrugated layer web has been passed about one of the corrugating rolls and put through the nip between them to give it its corrugated body configuration, the web is temporarily retained on the other corrugating roll, that is, on the web-discharging roll, while the adhesive is applied to the ridges of the web and one of the planar layer webs is bonded to it as indicated. Afterward, the composite is discharged from the roll and in a subsequent operation the other planer layer web is bonded to the other side of the corrugated layer web, using the same bonding technique but without the necessity for a back-up roll for the corrugated layer web inasmuch as the corrugated body configuration of the web is now fixed by the nature of the composite.

Heretofore, two techniques have been employed for temporarily retaining the corrugated layer web on the web-discharging roll and in registry with the contour thereof. One technique has involved stationing a set of arcuate fingers at circumferentially outboard sites along the length of the roll to confine the web to the periphery of the roll while a mating, circumferentially-grooved applicator roll applies adhesive to the ridges of the web. The other technique has involved building a set of arcuate grooves into the periphery of the roll at circumferentially inboard sites along the length thereof, and applying a vacuum to the grooves to hold the web on the roll while the adhesive is applied to the ridges of the same. Both techniques have been operative to retain the web on the web-discharging roll, but they have produced serious defects in the product. For example, the outboard finger technique has produced a defect in the fact that the fingers interrupt the continuity of the adhesive applicator surface, lengthwise thereof, and these interruptions in turn produce interruptions in the glue lines that are formed on the ridges of the corrugated layer web. Also, the fingers produce indentations in the ridges at the sites of the interruptions, and the indentations are aligned with one another on perpendiculars to the ridges so that the corrugated board product incorporates lines of weakness about which it tends to buckle or rupture when it is subjected to compression lengthwise of the ridges. The character of these lines of weakness is illustrated in the accompanying drawings and will be described in greater detail in connection with them.

Furthermore, the outboard finger technique has produced a defect in the fact that the fingers do not hold the corrugated layer web in strict registry with the contour of the web-discharging roll. That is, the web is able to "play" up and down in the grooves of the roll, and in doing so, develops malformations in its body configuration, and of course, develops them even as the first planar layer web and the corrugated layer web are being interfaced with one another. As a result, there is no assurance that the corrugated layer of the product will have a true corrugated body configuration, nor any assurance that it will have been properly interfaced with the first planar layer, and as a consequence, the industry must often accept in the product what are known as "high and low flutes" and "leaning flutes".

The inboard vacuum groove technique has produced a defect in the fact that the vacuum grooves produce actual interruptions in the corrugated body configuration of the corrugated layer, and of course, this again is a defect which influences the basic character of the product.

Heretofore, moreover, the principal adhesive employed in each of the bonding operations has been an adhesive such as starch or sodium silicate which requires cutting with water or some other dispersant which provides a vehicle whereby the adhesive is satisfactorily dispersed for use, and in particular, sufficiently dispersed to enable it to penetrate the sub-surface fibers of the webs and achieve the necessary physical effect. In order to achieve this effect, however, it has been necessary to carefully proportion the quantity of the dispersant in relation to the quantity of the adhesive solid. Since the available dispersant-cut adhesives comprise only about 25% solids, it has also been necessary to lay down a thick line of the adhesive on each ridge of the corrugated layer web, in order to assure that an adequate amount of adhesive solids will remain for the bonding effect after the dispersant has evaporated.

Additionally, it has been necessary to maintain a line thickness consistent with the mechanical tolerances of the adhesive applicator equipment, and the caliper differences of the web materials. In particular, the equipment has almost always included an applicator roll and a doctor roll with machined surfaces, and the mechanical tolerances of these surfaces, together with the usual caliper differences between the web materials, have made it imperative that the doctor roll leaves a film on the applicator roll, which is sufficiently "thick" to assure that the roll in turn will develop a line of adhesive on the ridges of the corrugated layer web, which is sufficiently "thick" to assure that the adhesive in turn will "bridge" between the webs when they are contacted with one another. In short then, the bonding operation as a whole has been quite delicate, since it has involved critical limits for the web and adhesive materials, and a high degree of precision in the adhesive applicator equipment.

For the foregoing reasons, the corrugated board industry has long sought other laminating techniques and/or other adhesive materials. One area of investigation in recent years has been the possibility of using the so-called hot melt or solid phase adhesives in place of the old dispersant-cut adhesives just mentioned. The solid phase adhesives need not be appreciably cut by any dispersant, and have the advantage that their adhesive mechanism does not require penetrating the subsurface fibers of the webs, nor the application of heat to the composite. Also, they can be used with a wide variety of substrates, even those which are relatively water impermeable. However, in spite of these advantages, they have not been widely used in the industry because of the mechanical problems which the industry has faced in adapting them to the same equipment which was built for the dispersant-cut adhesives.

These latter problems have been twofold. First, in order to lay down the minimum line thickness required by the existing equipment, it has been necessary to lay down far more solid phase adhesive than is needed, and this in turn has proven to be far too expensive in view of the relative cost of the solid phase adhesives. Also, this minimum line thickness has produced a far larger "body" of adhesive across the interface between the webs than is actually desired. In fact, the body of adhesive has been so great as to constitute virtually a third medium or stratum at each interface, and as such, has required a full structural integrity of its own. Again, all of this has followed from the fact that the existing equipment is designed and constructed to lay down a line of adhesive having only approximately 25% solids, whereas the new solid phase adhesives run upward of 100% solids. Thus, the same line of solid phase adhesive produces a far larger body of set adhesive at each interface, and this body may in fact be so great as to actually prevent the two layers from closely contacting one another, as is desirable in any bond which is to have a high structural integrity. On the other hand, all attempts to reduce the line thickness of the adhesive have met with little or no success, because in each case, it has still been necessary to lay down a thickness which can achieve a "bridge" between the two webs, and this "bridge" in turn requires substantially the same film thickness which was used previously with the dispersant-cut adhesives.

Second, the new adhesives have also posed maintenance problems in the equipment itself. Due to their higher solids content, they are far more viscous and "gummy" in nature, and this characteristic is particularly troublesome when outboard fingers are employed, since the adhesive tends to collect on the fingers, and in the finger grooves, and to cause clogging or jamming of the fingers in the grooves. The adhesive also tends to pull the corrugated layer web off of the corrugating roll, due to the tackiness generated by the adhesive between the applicator roll and the web.

In brief, the present invention eliminates the defects which the prior art equipment produced in the product, while at the same time making it possible to use the new solid phase adhesives in the process without the foregoing problems.

According to the invention, in each bonding operation discrete, pressure deformable spots of the adhesive are formed on the ridges of the corrugated surface defining layer, at intervals spaced apart from one another lengthwise of the ridges, and then one surface of the other layer is contacted with the spots, and the two layers are pressed together so that they splay the spots into the spaces therebetween, and are bonded together by the adhesive. In this way, the thickness of the "lines" of adhesive on the ridges can be set at whatever dimension is necessary to account for the mechanical tolerances of the applicator equipment and the caliper differences between the two layers. This follows from the fact that when the two layers are pressed together, the spaces between the spots accommodate the adhesive and enable the layers to achieve an optimum condition in which they closely approach one another, if in fact they do not contact one another. On the other hand, the pressure applied to the layers need only be that which is sufficient to achieve the splaying effect, and generally this is less than that which would cause one layer to deform the surface of the other. In practice, the optimum splaying effect is determined empirically and is that which achieves the maximum bonding effect without deforming the surfaces of the layers.

The spacing of the intervals between spots is a function of whether a continuous or discontinuous line of adhesive is sought, as well as a function of the splay which can occur within the above described limits. Where the spacing is sizeable, it is preferred to stagger the spots in relation to one another from one ridge to the next. In this way the spots are always out of alignment with one another perpendicularly of the ridges. On the other hand, where the frequency of the spots is such that they splay together, they may be aligned with one another from one ridge to the next.

In the presently preferred embodiments of the invention, the spots are formed by causing relative motion between the corrugated surface defining layer and a series of spaced parallel lines of adhesive which are disposed crosswise of the ridges of the layer and contacted with the ridges so as to deposit the spots thereon. In the initial bonding operation, the lines of adhesive may be formed on and about an adhesive applicator roll which is rotated in juxtaposition to the layer. Alternatively, the corrugated surface defining layer may be passed about a carrier roll which is rotated in juxtaposition to the lines. Preferably, the lines of adhesive and the corrugated surface defining layer are formed on and about a pair of rolls which are rotated in justaposition to one another.

The lines of adhesive may be formed by using a grooved cylindrical adhesive applicator roll, depositing the adhesive on the roll, and then doctoring the roll with a rectilinear doctoring device to remove all but the adhesive in the grooves. Alternatively, the lines of adhesive may be formed by using a plain cylindrical adhesive applicator roll, depositing the adhesive on the roll, and doctoring the roll with a grooved doctoring device to remove all but the adhesive in the grooves.

Where a staggered effect is desired, either the grooved cylindrical adhesive applicator roll or the grooved doctoring device may have a helical groove therein. Alternatively, one of the adhesive applicator roll and the doctoring device may have axially spaced grooves therein, and may be oscillated lengthwise of the axis. Also, in such a case, the grooves may extend circumferentially of the device and the device may also be rotated about the axis.

One technique for retaining the corrugated surface defining layer on the carrier roll is to generate a pressure differential thereacross. For example, the carrier roll may be apertured, and a vacuum may be generated inside of the roll and applied to the apertures so as to retain the layer on the roll. Where the corrugated surface defining layer has a corrugated body configuration, preferably, the carrier roll has a corresponding outer peripheral surface contour, and the apertures are disposed in the grooves in the outer peripheral surface of the roll. Preferably, too, each groove has a series of apertures therein which are spaced apart from one another lengthwise of the groove.

Where the layers are laminated to one another in a corrugated board forming machine, the carrier roll for the corrugated layer web may be the web-discharging roll in the pair of corrugating rolls which from the corrugated body configuration of the web.

The product is a laminar composite wherein the layers have a bond interposed therebetween along each ridge of the corrugated surface defining layer. The bond consists essentially of a series of relatively localized spots of a plastically deposited but adhesively set adhesive material. The spots are located at the intervals indicated, and are characterized with oblate cross sections in planes normal to the interface between the layers, resulting, of course, from the fact that the spots undergo compression in the plastic state thereof. Also, as indicated, the spots may contact one another across the spaces therebetween; and may be staggered in relation to one another from one ridge to the next. Where a pressure differential is employed to retain the corrugated surface defining layer on its carrier roll, the ridges may have continuously uninterrupted rectilinear profiles along the crests thereof. Also, the ridges and grooves of the corrugated surface defining layer may be substantially sinusoidally contoured in the directions crosswise thereof.

The adhesive may be any suitable bonding adhesive, including those previously mentioned.

BRIEF DESCRIPTION OF THE DRAWINGS

These features will be better understood by reference to the accompanying drawings which illustrate one of the presently preferred embodiments of the invention and certain modifications thereof.

In the drawings.

DESCRIPTION OF THE PREFERRED EMBODIMENT

Figures 1, 17, 18, 19, 20:
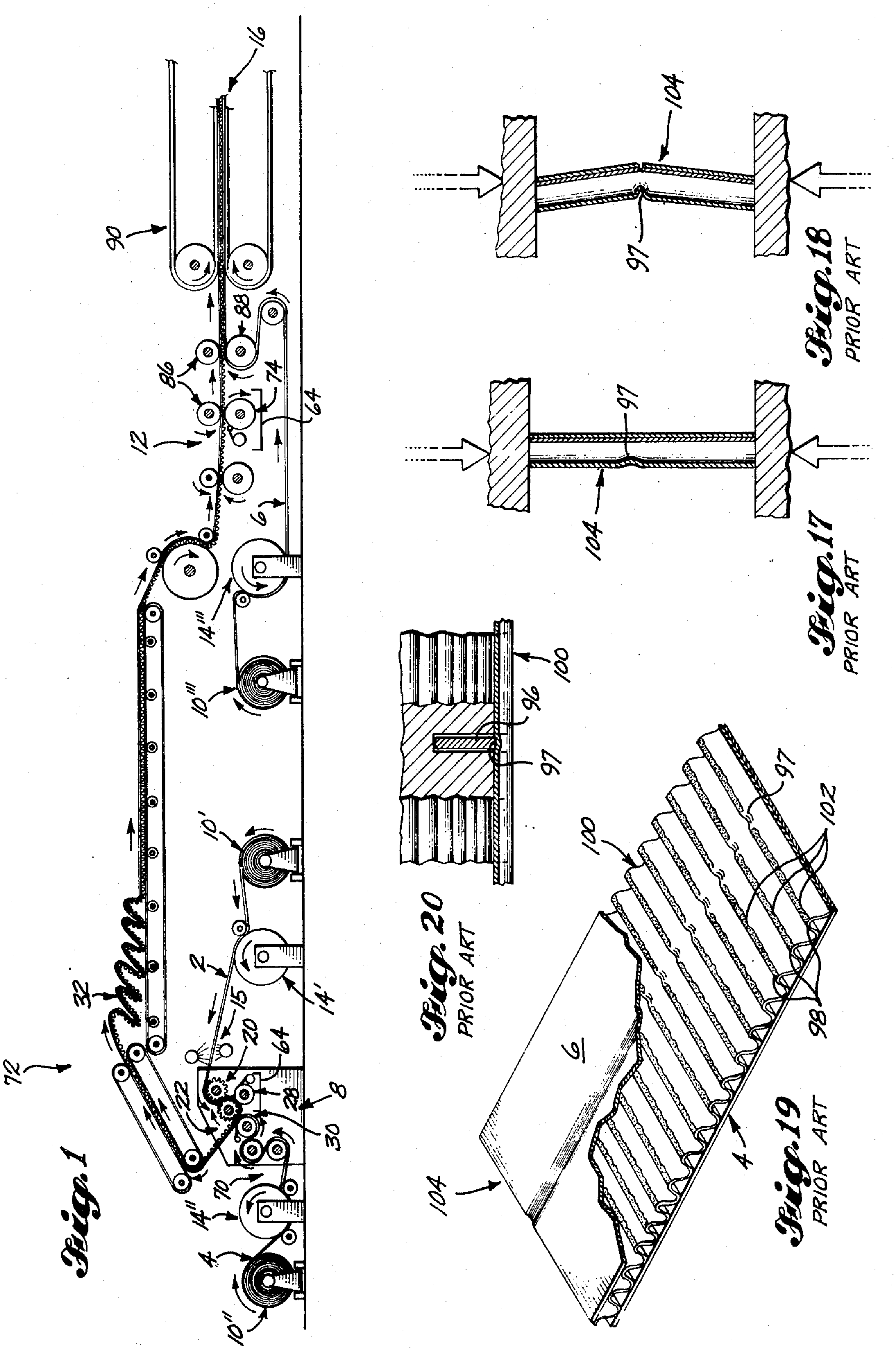
Fig. 17 PRIOR ART
Fig. 18 PRIOR ART
Fig. 19 PRIOR ART
Fig. 20 PRIOR ART
FIG. 1 is a schematic side elevational view of a double-facer corrugated board forming machine constructed in accordance with the invention.
FIG. 17 is a similar representation of a prior art product under compression.
FIG. 18 is the same representation at the point of failure of the prior art product.
FIG. 19 is a part fragmented perspective view of the prior art product.
FIG. 20 is a part cross-sectional view of a finger-equipped corrugating roll of the type which has been employed in prior art apparatus for making the prior art product.
Figure 2:
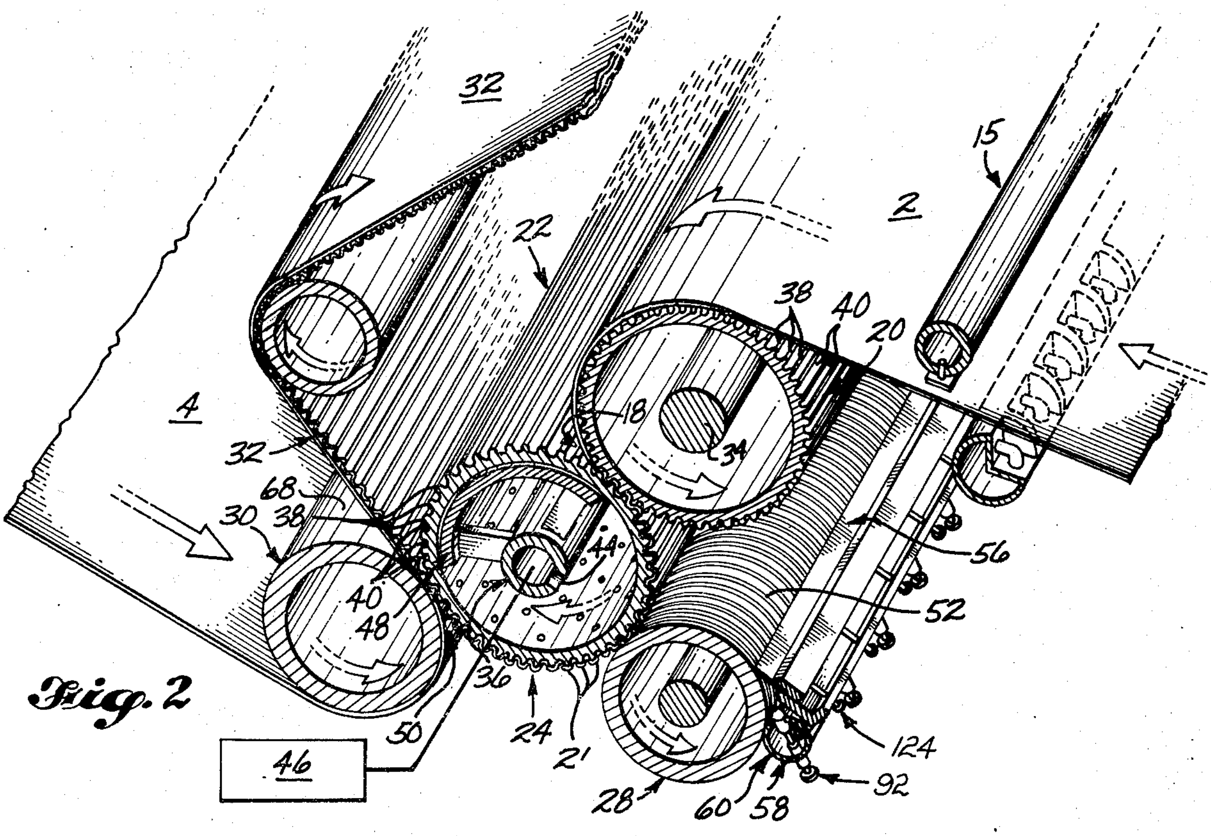
FIG. 2 is a part perspective view of the first lamination stage of the machine wherein a first planar layer web is bonded to the corrugated layer web to form an intermediate single faced composite.
Figure 3:
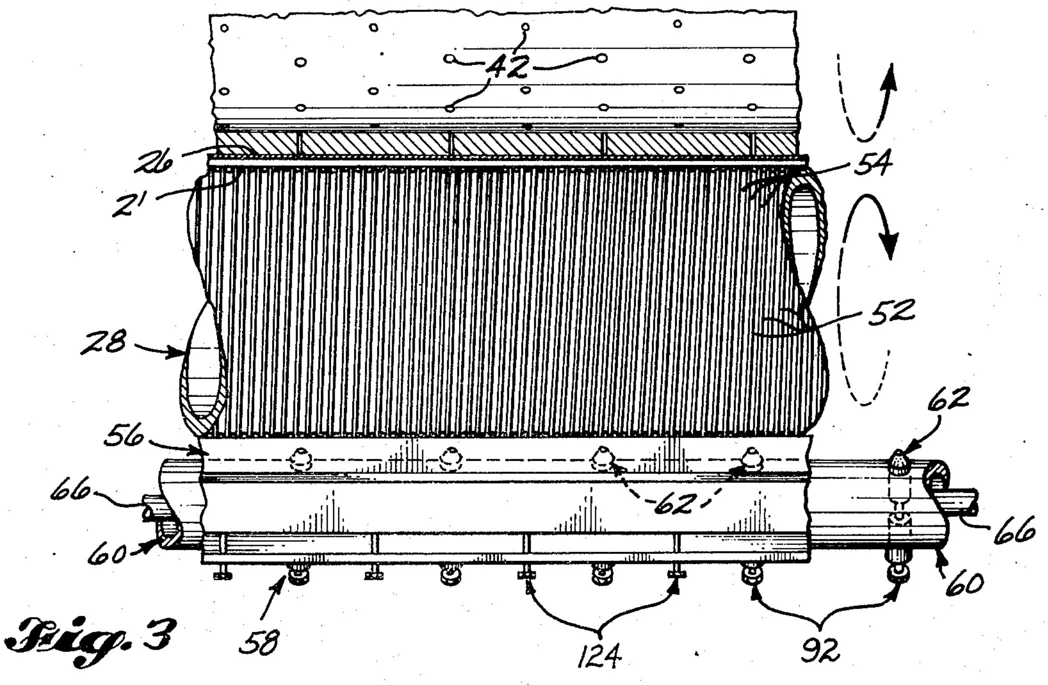
FIG. 3 is a part plan view of the adhesive application stage of the first lamination stage.

Referring first to FIGS. 1–3, it will be seen that the machine employs three webs of paper 2, 4, and 6, one 2 of which is fed into the first lamination stage 8 from a carrier roll 10′ at the center of the machine, and the other two 4 and 6 of which are fed into the first and second lamination stages, 8 and 12, respectively, from carrier rolls 10″ and 10‴ disposed more adjacent the ends of the machine. Each of the webs is fed by a power driven feed and conditioning roll 14′, 14″, or 14‴, and may or may not be subjected to steam preheating, as for example at 15, depending on the nature of the adhesive employed. The web 2 becomes the corrugated layer of the final composite 16, while the webs 4 and 6 become the first and second facing layers.

The web 2 is given its corrugated body configuration in the first lamination stage, as a consequence of being passed through the nip 18 (FIG. 2) between a pair of power driven corrugating rolls 20 and 22 which are juxtaposed in parallel but vertically staggered relationship to one another and mated together in conventional fashion at the nip. The relatively upper, web-receiving roll 20 is driven in the counterclockwise direction, whereas the relatively lower web-discharging roll 22 is driven in the clockwise direction. Normally, at least the upper roll is steam heated. Also, the lower roll 22 is equipped with a vacuum means 24 for temporarily retaining the corrugated layer web 2 on the exterior surface 26 (FIG. 3) of the same, after the web has exited from the nip 18 with its corrugated body configuration. The vacuum means is also operative to maintain the corrugated layer web in close registry with the contour of the surface 26, and maintains it in such condition while the web is spotted with adhesive and then laminated with the first facing-layer web 4. The adhesive is applied to the corrugated layer web 2 by a power driven adhesive applicator roll 28 which is mounted in parallel juxtaposition with the roll 22 and contacted with the corrugated layer web 2 while the web is subject to the vacuum in the roll. The lamination step is accomplished by a pressure roll 30 which is in receipt of the facing layer web 4 and mounted in parallel juxtaposition with the roll 22 so as to feed the facing layer web in the direction of travel of the corrugated layer web, and to bond the facing layer web to the corrugated layer web as the latter exits from its path of travel around the roll 22. Afterward, the intermediate two-layer composite 32 is reversed in direction, and is fed out of the first lamination stage 8 into the second stage 12 where the second facing layer web 6 is bonded to the composite 32 in a somewhat similar manner, but on the opposite side of the web 2, as shall be explained hereinafter.

Turning now to FIGS. 2 and 3 in particular, it will be seen that each of the corrugating rolls 20 and 22 has a hollow cylindrical body construction and is spider mounted on a fixed spindle 34 or 36 for lightness. Alternately, each roll may be hub mounted. In all events, each is also axially elongated, and is equipped with fluting which runs in the axial direction so that the exterior surface of the roll has alternate, straight, parallel axially extending, substantially sinusoidally contoured ridges 38 and grooves 70 about the circumference thereof. Moreover, the spindle 36 of the lower roll 22 is hollow and ported, and the bottoms of the grooves 40 in the surface 26 of the roll have apertures 42 therein which are spaced apart from one another lengthwise of the roll 22, but at relatively staggered locations from one groove 40 to the next circumferentially of the roll. The apertures open into the interior of the roll 22 and because of the ports 44 in the spindle 36, are subject to a vacuum which is generated in the spindle by a vacuum producing means 46 interconnected with the spindle at one end thereof. The effect of the vacuum is limited, however, by the fact that the spindle 36 is also equipped with an arcuate shoe 48 which is secured to the spindle 36 so as to assume a position in which it is relatively rotatably engaged with the interior surface of the roll 22 throughout the clockwise arc defined between the nip 50 formed by the pressure roll 30 and the lower corrugating roll 22, and the nip 18 formed by the upper and lower corrugating rolls 20 and 22. The shoe 48 effectively closes the apertures 42 over this arc, although as a practical matter the effect is only to save on the vacuum generating capacity of the vacuum producing means 46, since the shoe could otherwise be discarded.

The adhesive applicator roll 28 also has a hollow cylindrical, spindle or hub mounted body construction and is coextensive with the lower corrugating roll 22 in the axial direction thereof. However, the exterior surface of the adhesive applicator roll is grooved, and the groove 54 extends helically about the roll from one end thereof to the other, leaving a helical land 52 on the surface of the roll. The roll is driven in the counterclockwise direction and in operation, the land 52 relatively rotatably engages the exposed ridges 2' of the corrugated layer web 2 while the groove 54 moves opposite the ridges 2' and because of its helical path, moves from ridge to ridge at a slant dictated by the angle of the groove. Thus, the groove 54 interfaces with the ridges 2' at intervals which are spaced apart from one another lengthwise of the roll 22 but staggered in relation to one another from one ridge 2' to the next lengthwise of the web 2.

According to the invention, lines of the bonding adhesive are formed in the groove 54 for contact with the ridges of the web. The lines are formed by applying the adhesive to the surface of the appplicator roll 28 and then doctoring the surface with a doctor blade 56 which is interposed between the adhesive applicator mechanism 58 and the lower corrugating roll 22 in the direction of travel of the applicator roll 28. The applicator mechanism 58 includes an adhesive carrier pipe 60. The pipe is arranged in parallel to the applicator roll 28 on the opposite side thereof from the lower corrugating roll, and is equipped with a series of longitudinally spaced and adjustably orificed nozzles 62 which convert it into a manifold for flooding the adhesive onto the surface of the roll at a point just ahead of the doctor blade 56. The blade is angled to the roll 28 in the direction of travel, and is relatively rotatably engaged with the land 52 of the roll to doctor the land in the manner indicated, there being a tray 64 (FIG. 1) below the roll to catch and recirculate the removed adhesive. In addition, a smaller diameter pipe 66 extends coaxially of and within the manifold 60 to carry a hot fluid, such as oil, which effectively maintains the temperature of the adhesive at the required degree of flowability.

The pressure roll 30 is also lightly constructed, and is coextensive with the lower corrugating roll 22 but characterized with a plain, smooth, cylindrical surface 68 on the exterior thereof. The roll 30 is driven in the counterclockwise direction, and as seen in FIG. 1, the first facing layer web 4 is passed about the same after being first passed through a pair of cooperating tensioning rolls 70. The roll 30 lightly engages the web 4 with the adhesively spotted ridges 2' of the corrugated layer web 2, and effectively bonds one web to the other, as shall be more fully explained hereinafter with reference to FIGS. 6–14. Moreover, because of the fact that throughout its path of travel between the nip 18 and the nip 50, the corrugated layer web 2 is retained in close registry with the contour of the lower corrugating roll, the webs 2 and 4 are bonded to one another only in the desired interfacial relationship, and only in the desired body configuration for the corrugated layer web 2, as has been explained hereinbefore.

Figure 4:
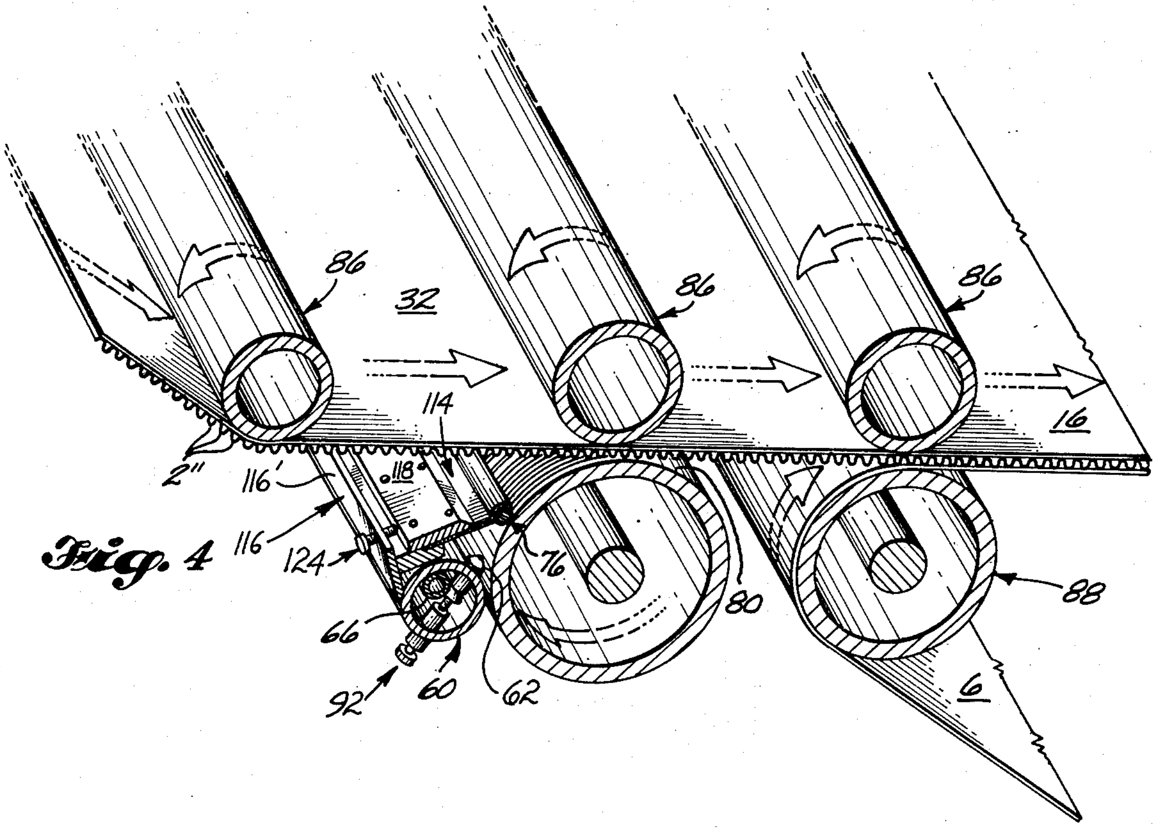
FIG. 4 is a part perspective view of the second lamination stage wherein a second planar layer web is bonded to the intermediate composite to form the final double-faced composite.
Figure 5:
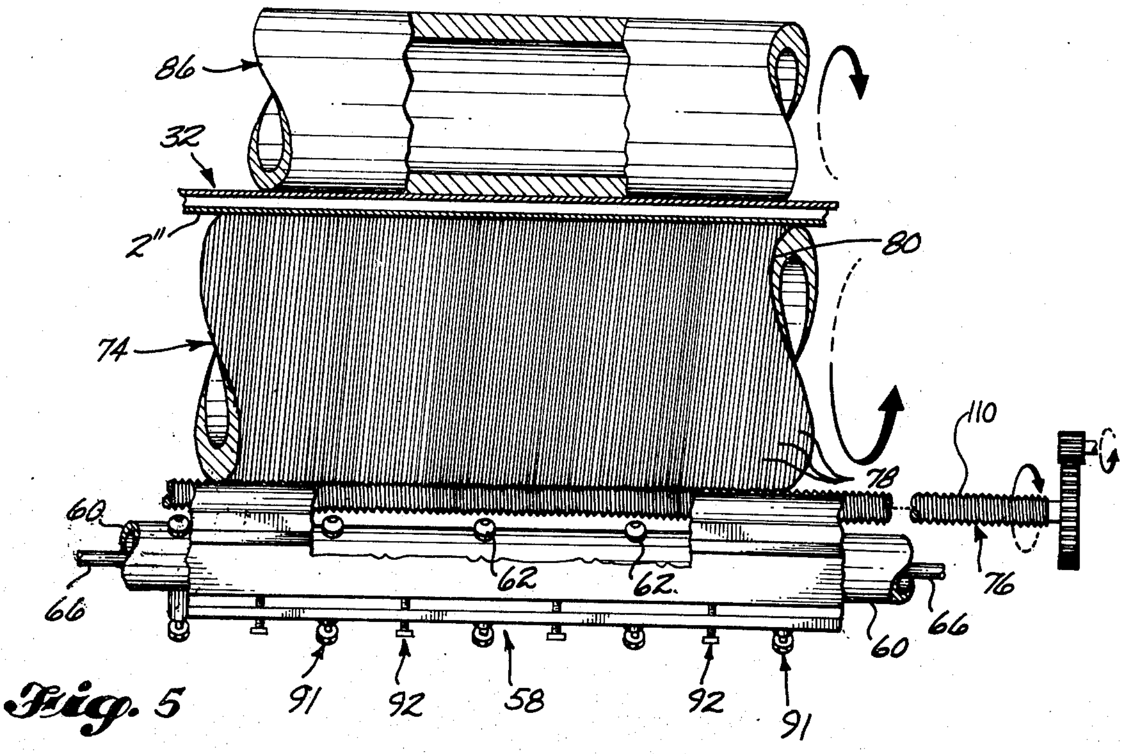
FIG. 5 is a part plan view of the adhesive application stage in this second lamination stage.
Figure 6:
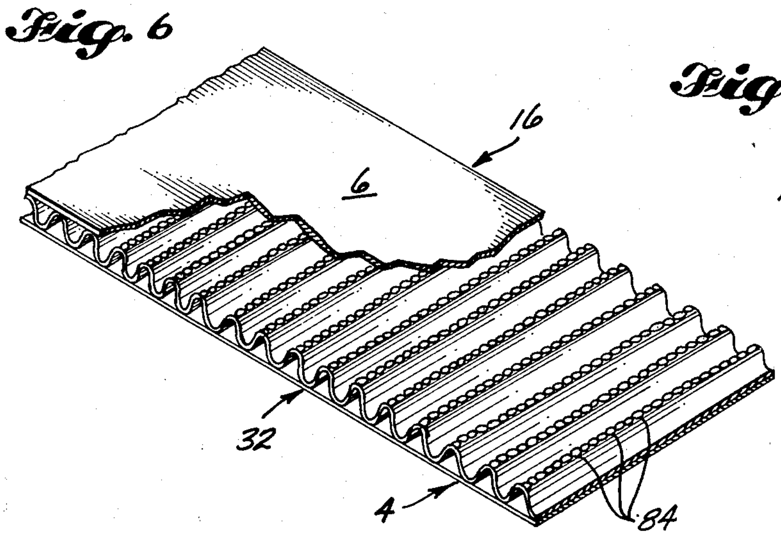
FIG. 6 is a part fragmented perspective view of the final product.

Referring now to FIGS. 1, 4 and 5, it will be seen that following the first lamination stage 8, a system 72 of belt conveyors effectively reverses the orientation of the composite 32, so that the composite assumes a condition in which the first facing layer web 4 is disposed above the corrugated layer web 2. The same condition continues as the composite 32 enters the second lamination stage 12, and in this stage, adhesive is spotted onto the ridges 2'' on the underside of the corrugated layer web, that is, the side opposite from the first facing layer web 4. The means for applying the adhesive include a plain, smooth, cylindrically surfaced, spindle mounted applicator roll 74. The roll 74 is mounted crosswise of the composite 32 in cooperation with a power driven doctor device 76 which is relatively rotatably engaged with the surface 80 of the roll so as to form a pattern of raised, helically extending lines 78 of the adhesive on the roll for application to the ridges 2'' of the web 2. As in the first lamination stage, the adhesive is discharged onto the roll 74 from a heated manifold 60, the nozzles 62 of which are tangentially angled to the roll in the direction of travel thereof and disposed at a point ahead of the doctor device 76. The adhesive flows over the surface 80 of the roll and forms a coating thereon, but the coating is immediately doctored into the helical pattern of the lines 78 by the doctor device 76. Consequently, when the surface 80 of the roll interfaces with the ridges 2'' of the web 2, the adhesive is laid down on the ridges as localized spots 84 (FIGS. 8 and 11), and the spots are disposed at intervals spaced apart from one another lengthwise of the ridges 2'' but staggered in relation to one another from one ridge to the next lengthwise of the composite 32.

Figure 21:
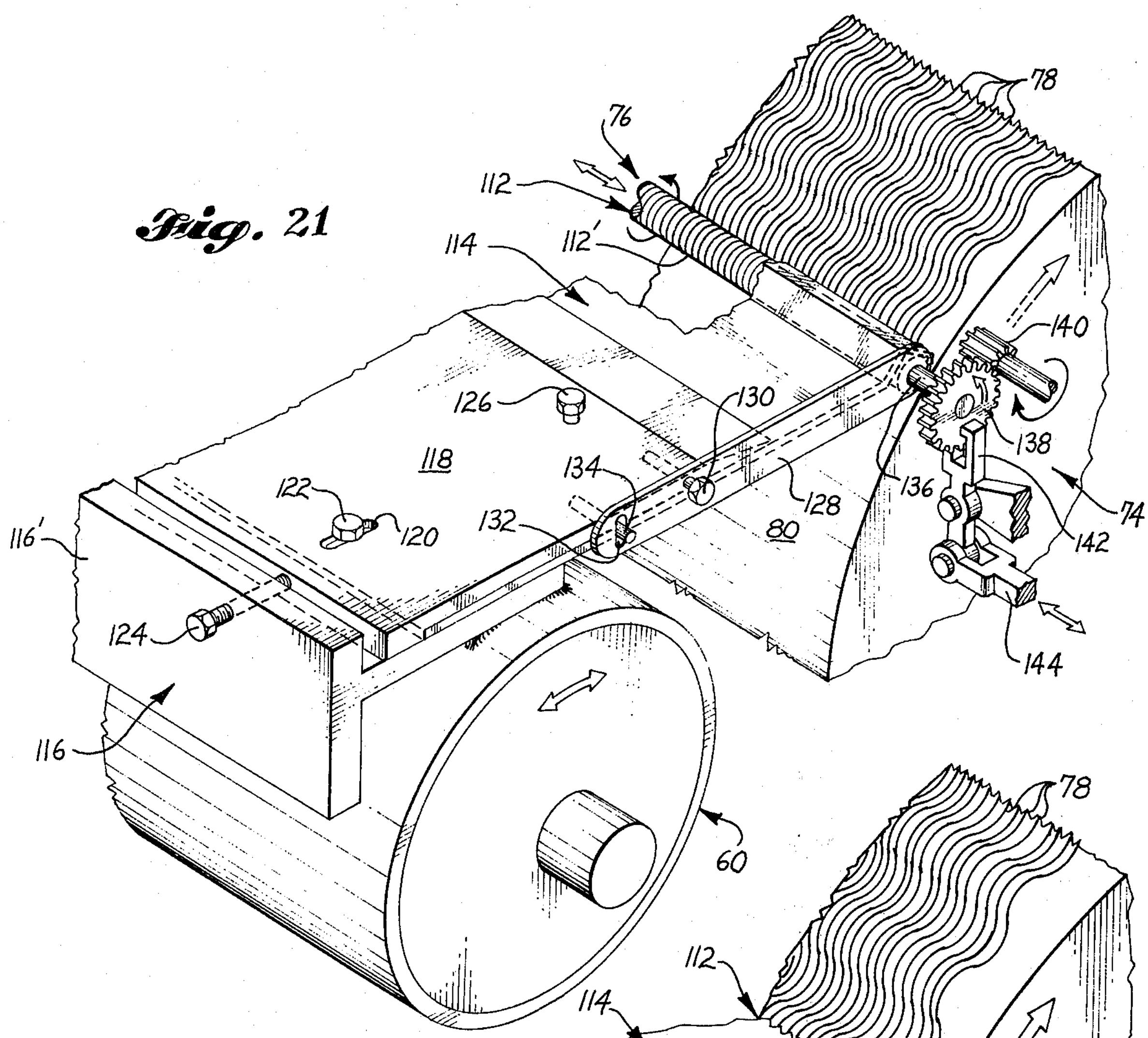
FIG. 21 is a relatively enlarged part perspective view of a modified version of the adhesive application stage in the second lamination stage of the inventive machine.
Figure 22:
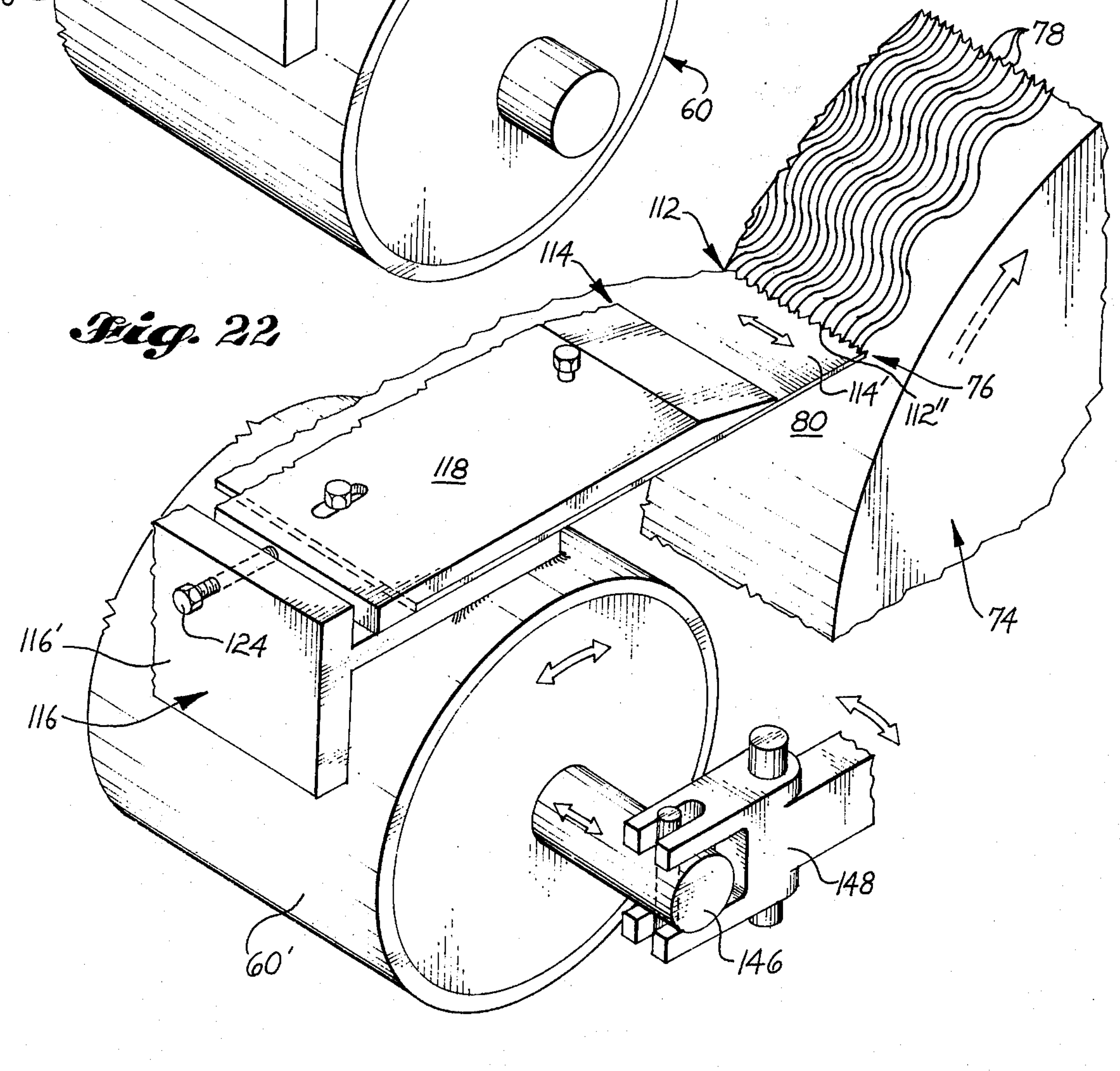
FIG. 22 is another such view of still another version of the adhesive application stage in the second lamination stage of the machine.

The device 76 may take the form of a rotatably driven rod 110 which has a helical groove therein, as in FIGS. 4 and 5; or the device 76 may take the form of a rod 112 which has axially spaced grooves therein, and which is oscillated lengthwise of its axis, as well as perhaps rotated about its axis. FIG. 21 illustrates an arrangement wherein the device 76 takes the form of a cylindrically formed but circumferentially grooved rod 112' which is rotated about its longitudinal axis as well as oscillated lengthwise of the axis; whereas FIG. 22 illustrates an arrangement wherein the device 76 takes the form of a flat but edge notched rod 112'' which is simply oscillated lengthwise of its edge.

In each case, the doctor device 76 is mounted on the distal end of a blade 114 which is flexibly cantilevered in the direction of the roll 74 and operative to yieldably engage the device with the surface 80 of the roll. Referring to FIGS. 21 and 22 in particular, it will be seen that the manifold 60 has an edge-reinforced bed plate 116 welded or otherwise secured to the top thereof, and the blade 114 is clamped between this bed plate and an overlying backup plate 118 so as to be flexibly cantilevered from the plates in the direction of the roll 74. In addition, the holes 120 for the clamping bolts 122 are slotted so that the blade can be advanced and retracted with respect to the roll, and adjustment screws 124 are provided in the built-up edge 116' of the bed plate to use in shifting the blade in relation to the roll. Also, the manifold 60 is adjustable rotatably so that the blade can be inclined to the roll 74 at an appropriate angle to maintain the doctor device 76 under a slight bias as it bears on the surface 80 of the roll. Cap screws 126 are also provided on the top of the backup plate 118 to aid in adjusting the tension in the blade, and altogether the arrangement is such that the machine operator can place the doctor device 76 under sufficient bias to assure that it will remain on the surface 80 of the roll notwithstanding that the surface may have a slight ellipticity or other irregularity about the circumference thereof.

Where a rotatable rod is employed as the doctor device, as in FIGS. 4, 5 and 21, the rod may be carried in a pair of elongated arms 128 which are pivotally interconnected with the laterally oriented edges of the blade assembly 114, 116, and 118. Each arm 128 is secured to the blade assembly by a cap screw 130 which also provides a pivot for the arm; and in addition, each arm has a vertically oriented slot 132 in the proximal end thereof whereby a laterally outstanding pin 134 on the blade assembly can be engaged in the slot to act as a stop for the pivotal movement of the arm. Moreover, the ends of the rod 110 or 112' are shaped as axles, the axles 136 are rotatably engaged in the distal ends of the arms, and one axled end of the rod is equipped with a spur gear 138 which is engaged in turn with another such gear 140 that is power driven to turn the rod.

In FIG. 21, the gear 140 is elongated to allow for axial reciprocation of the gear 138 relative thereto, even while the gears are engaged and turning. The reciprocatory effect is generated by a lever-mounted yoke 142 which is pivotally interconnected with a power driven oscillating link 144. The yoke straddles the gear 138 and responds to the oscillatory motion of the link 144 by causing the same motion on the part of the gear 138, and thus the rod 112' as well. The motion of the rod in turn produces an oscillatory effect in the lines 78 of the adhesive. Meanwhile, the rod rides over the surface 80 of the roll 74, and under the bias of the blade 114, closely follows the contour of the roll.

In FIG. 22 a notched edged blade 114' is substituted for the blades of FIGS. 4, 5 and 21, and the edge 112'' of the blade is applied directly to the surface 80 of the roll 74. Moreover, the manifold 60' is flexibly coupled with the various liquid feeds to it, and is oscillated along its lengthwise axis to impart a corresponding oscillation to the blade 114'. As seen, the manifold has an axled end 146 and an oscillating yoke 148 is clevised to the end to impart the oscillation to the manifold.

The second lamination stage 12 also resembles the first inasmuch as the adhesively spotted web 2 is subsequently interfaced with the second facing layer web 6 and the latter web is lightly pressure bonded to the composite 32 to produce the final three layer product 16. In the second stage, however, the weight of the two layer composite 32 can be employed as a hold-down force for the spotting and bonding steps, although as indicated in FIGS. 1 and 4, a series of idler rolls 86 is normally disposed above the composite to maintain it in a planar condition as it passes over the adhesive applicator roll 74 and the pressure applicator roll 88.

After the two lamination stages, the final composite 16 is sent onto a cutter (not shown), and/or to other stages 90 which have no part in the invention and therefore are not specifically illustrated. As is conventional, moreover, the conveyor system 72 between the two stages feeds the composite in a slackened condition to avoid the necessity for synchronizing the stages.

In both lamination stages, the applicator mechanism 58 also includes screw-operated valves 92 for adjusting the adhesive flow through the orifices of the nozzles 62.

Figure 7:
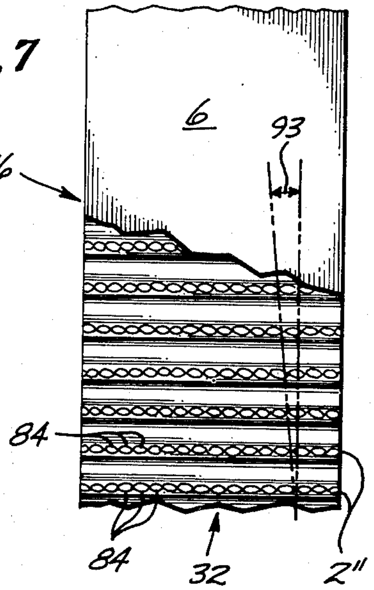
FIG. 7 is a similarly fragmented plan view of the product.
Figure 8:
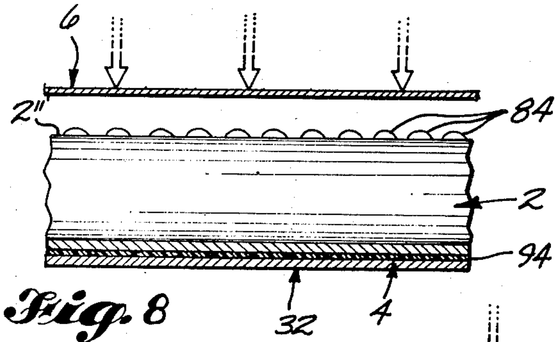
FIG. 8 is a schematic part cross-sectional representation of the contact stage of the second lamination stage.
Figure 9:
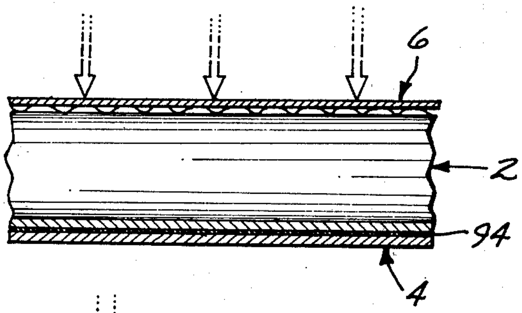
FIG. 9 is another such representation of the pressure application stage, illustrating the splaying action which occurs in the adhesive spots when the second planar layer web is pressed into engagement with the intermediate composite.
Figure 10:
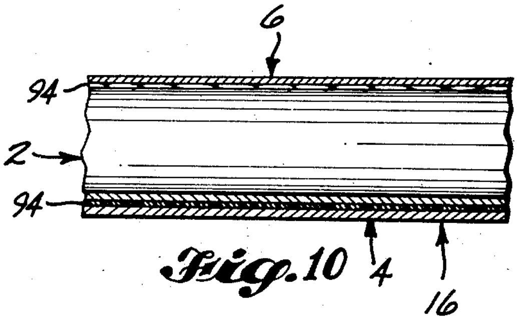
FIG. 10 is a third such representation of the second lamination stage after the splaying action has been completed and thus illustrating the full effect of the splaying action.
Figure 15:
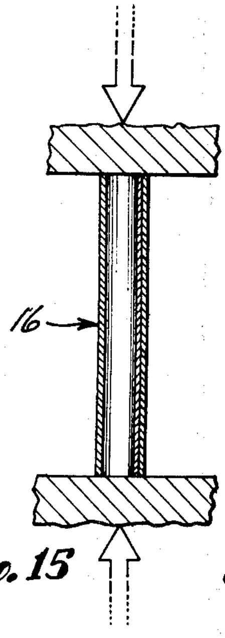
FIG. 15 is a part cross-sectional schematic representation of the present product under compression.
Figure 16:
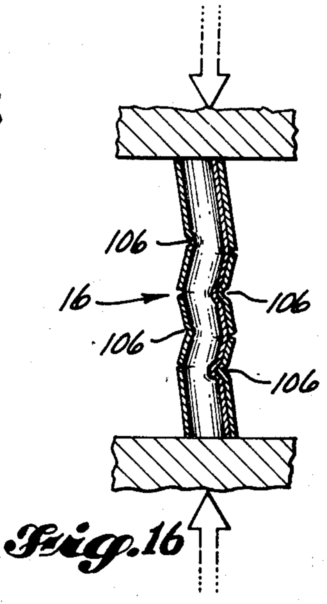
FIG. 16 is a similar representation of the product at the point of failure.
Figure 13:
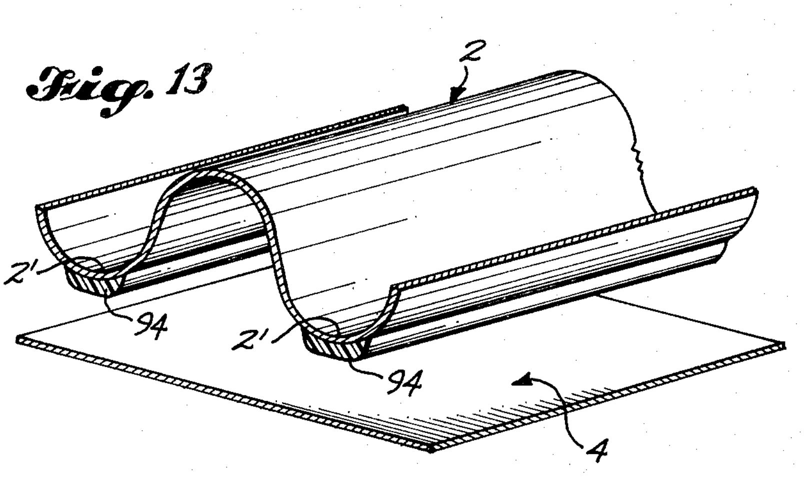
FIG. 13 is a representation corresponding to FIG. 11, but illustrating the undesirable result that would be achieved were a continuous line of adhesive formed on each ridge of the corrugated layer web.

FIGS. 6–20 illustrate the nature of the composite product 16 and some of the distinctions between it and prior art products. Referring first to FIG. 8, it will be seen that the adhesive is laid down on the ridges 2'' of the corrugated layer web 2 in localized spots 84 that are spaced apart from one another lengthwise of the ridges. Also, as seen in FIG. 7, the spots are staggered in relation to one another from one ridge to the next in the directions crosswise of the ridges and lengthwise of the product. See angle 93 and note the increment of advancement of the spots from ridge to ridge due to the helical pattern in which they are laid down. Depending on the spacing between the spots, the helical pattern may or may not be critical. In some embodiments of the invention, the spots are laid down in mutually aligned condition from ridge to ridge due to the narrow spacing between spots. However, in most instances, a staggered relationship from ridge to ridge is preferred.

FIGS. 8–12 illustrate the manner in which the spots 84 are squashed and splayed into the spaces therebetween as each of the facing layer webs 4 and 6 is applied to the ridges 2' or 2'' of the corrugated layer web 2. The spaces may in fact be closed by the splaying action so that the spots contact one another to form a continuous line of adhesive 94, or they may remain open in part so that the line of adhesive is somewhat discontinuous. This again is a variable which can be readily controlled, depending on the result which is sought.

Figure 14:
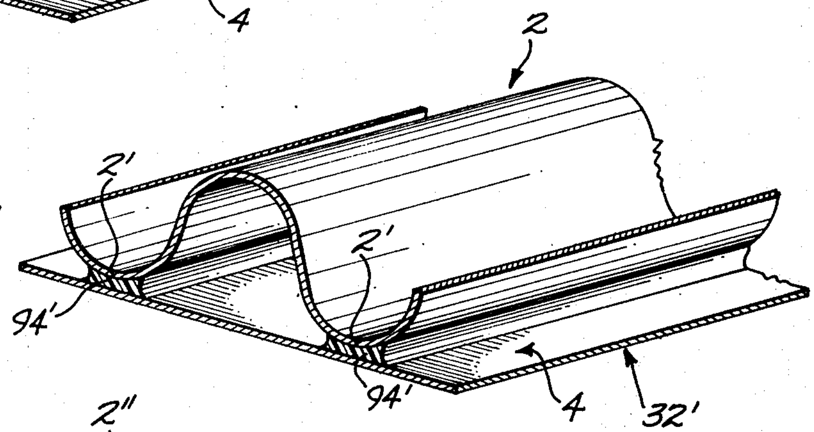
FIG. 14 is another such representation illustrating the composite which would be produced under the circumstance in which such a line of adhesive was formed on each ridge.
Figure 11:
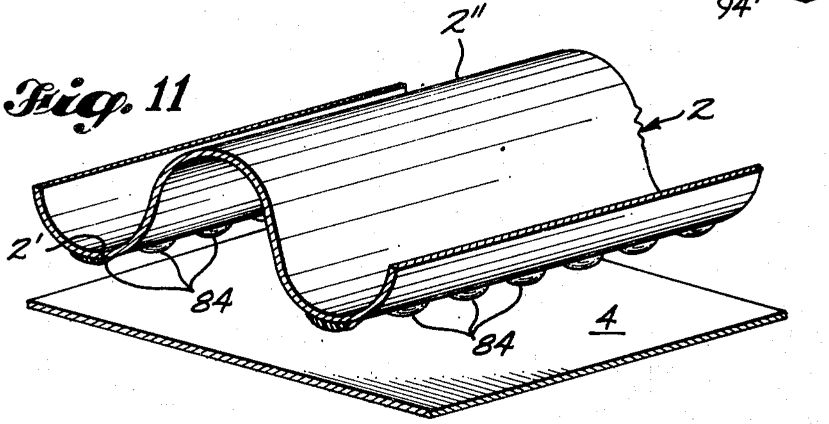
FIG. 11 is a part perspective schematic representation of the contact state of the first lamination stage, after the adhesive has been spotted onto the corrugated layer web, but before the first planar layer web has been bonded therewith.
Figure 12:
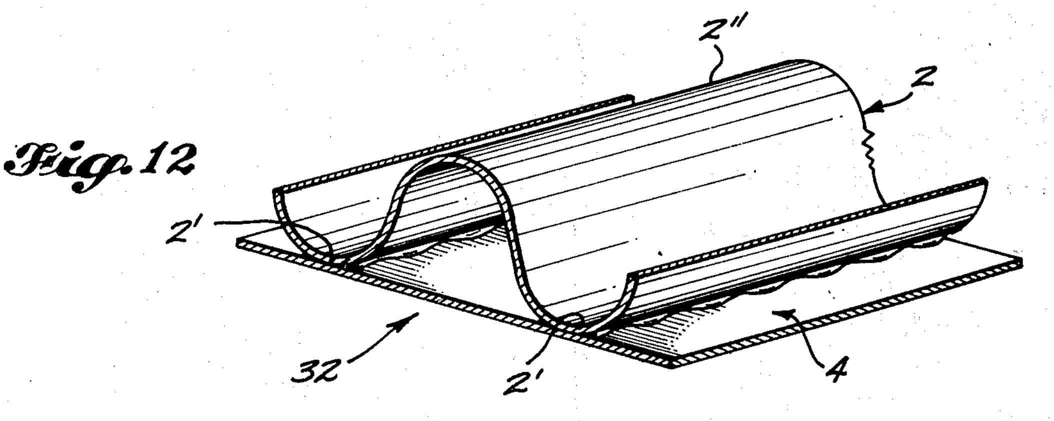
FIG. 12 is a similar representation of the first lamination stage after the first planar layer web has been bonded with the corrugated layer web.

FIGS. 11 and 12 also illustrate the fact that each facial layer web is pressed into virtual contact with the ridges 2' or 2'' of the corrugated layer web. Were adhesive 94 blanketed over each ridge of the corrugated layer web, preliminary to the web being interfaced with a facial layer web, as in FIG. 13, then to meet mechanical tolerances and to account for caliper differences in the web materials, the adhesive would have to be laid down in a thick line, and as indicated in FIG. 14, the resulting line or seam 94' of adhesive would actually become an additional laminar element in the composite 32', and one having its own distinct characteristics. On the other hand, as illustrated in FIG. 12, the present invention enables each facial layer web to substantially contact the corrugated layer web at the ridges thereof, so that only the webs constitute layers of the composite.

Also, as seen in FIG. 20, the fingers 96 employed in the prior art devices produced both a break 97 in the continuity of each ridge 98 of the corrugated layer web 100, and a break in the continuity of the line 102 of adhesive on the same. Worst of all, the resulting depressions 97 in the ridges, and the gaps in the adhesive, were mutually aligned with one another on crosswise perpendiculars to the ridges. See FIG. 19. As a consequence, when the corrugated product 104 was subjected to compression, as in FIG. 17, the so-called finger lines 97 constituted lines of weakness at which early failure tended to occur. See FIG. 18 and compare this with FIG. 15 wherein the present product 16 is illustrated under compression, and as seen, is free of any such weakness zones, so that it does not buckle or otherwise fail until the compressive forces simply overcome the strength of it, whereupon it normally fails at many points 106, as might be expected.

What is claimed is:

1. A method of laminating two or more layers of sheet material, one of which has a corrugated surface thereon and the other of which has a planar surface thereon, comprising passing the corrugated surface defining layer about a carrier roll, generating a pressure differential across the carrier roll to retain the corrugated surface defining layer thereon, rotating the carrier roll in juxtaposition to a series of spaced parallel lines of adhesive that are disposed crosswise of the ridges of the corrugated surface defining layer and contacted with the ridges so as to deposit series of spaced, pressure deformable spots of adhesive along the lengths of the ridges of said layer, and thereafter contacting the planar surface of the other layer with the series of spots on the ridges of the corrugated surface defining layer, pressing the two layers together so that they splay the respective spots into the spaces therebetween and form substantially continuous lines of adhesive along the lengths of the ridges, and bonding the two layers together at the lines of adhesive on the ridges, including at points on the planar surface of the other layer coinciding with the spaces between the spots.

2. The method according to claim 1 further comprising staggering the spots in relation to one another from one ridge to the next.

3. The method according to claim 1 wherein the lines of adhesive crosswise of the ridges are formed on and about an adhesive applicator roll which is rotated in juxtaposition to the corrugated surface defining layer.

4. The method according to claim 1 wherein the lines of adhesive crosswise of the ridges and the corrugated surface defining layer are formed on and about a pair of rolls which are rotated in juxtaposition to one another.

5. The method according to claim 1 wherein the lines of adhesive crosswise of the ridges are formed by depositing the adhesive on a grooved cylindrical adhesive applicator roll, and doctoring the roll with a rectilinear doctoring device to remove all but the adhesive in the grooves thereof.

6. The method according to claim 1 wherein the lines of adhesive crosswise of the ridges are formed by depositing the adhesive on a plain cylindrical adhesive applicator roll, and doctoring the roll with a grooved doctoring device to remove all but the adhesive in the grooves thereof.

7. The method according to claim 5 wherein the grooved cylindrical adhesive applicator roll has a helical groove therein.

8. The method according to claim 6 wherein the grooved doctoring device has a helical groove therein.

9. The method according to claim 6 wherein the grooved doctoring device has axially spaced grooves therein and is oscillated lengthwise of the axis.

10. The method according to claim 9 wherein the grooves extend circumferentially of the device and the device is also rotated about the axis.

11. The method according to claim 1 wherein the carrier roll is apertured and a vacuum is generated inside of the carrier roll and applied to the apertures so as to retain the layer on the roll.

12. The method according to claim 11 wherein the corrugated surface defining layer has a corrugated body configuration, the carrier roll has a corresponding outer peripheral surface contour, and the apertures are disposed in the grooves in the outer peripheral surface of the roll.

13. The method according to claim 12 wherein each groove has a series of apertures therein which are spaced apart from one another lengthwise of the groove.

14. The method according to claim 1 wherein the layers are laminated to one another in a corrugated board forming machine, and the carrier roll for the corrugated layer web is the webdischarging roll in the pair of corrugating rolls which form the corrugated body configuration of the web.

* * * * *

UNITED STATES PATENT OFFICE

CERTIFICATE OF CORRECTION

Patent No. 3,972,763 Dated August 3, 1976

Inventor(s) Arthur Dale Wolvin et al.

It is certified that error appears in the above-identified patent and that said Letters Patent are hereby corrected as shown below:

Column 1, line 35, "then" should read -- them --.

Column 7, line 53, "grooves 70" should read -- grooves 40 --.

Signed and Sealed this

Twenty-second Day of February 1977

[SEAL]

*Attest:*

RUTH C. MASON
*Attesting Officer*

C. MARSHALL DANN
*Commissioner of Patents and Trademarks*

Disclaimer 3,972,763.—*Arthur Dale Wolvin*, Longview, and *Richard Milton Morris, Jr.*, Bellevue, Wash. METHOD OF LAMINATING PLANAR AND CORRUGATED SURFACE DEFINING LAYERS OF SHEET MATERIAL. Patent dated Aug. 3, 1976. Disclaimer filed May 1, 1978, by the assignee, *Weyerhaeuser Company*.

Hereby enters this disclaimer to claims 1–5, 7 and 11–14 of said patent.

[*Official Gazette July 4, 1978.*]